(12) United States Patent
Lecomte et al.

(10) Patent No.: US 11,109,708 B2
(45) Date of Patent: Sep. 7, 2021

(54) APPARATUS FOR MAKING A DRINK

(71) Applicant: KUANTOM, Paris (FR)

(72) Inventors: Valentin Lecomte, Mennecy (FR); Geoffrey Martins, Cormeilles-en-Parisis (FR)

(73) Assignee: KUANTOM, Paris (FR)

( * ) Notice: Subject to any disclaimer, the term of this patent is extended or adjusted under 35 U.S.C. 154(b) by 171 days.

(21) Appl. No.: 16/078,307

(22) PCT Filed: Feb. 21, 2017

(86) PCT No.: PCT/EP2017/053955
§ 371 (c)(1),
(2) Date: Aug. 21, 2018

(87) PCT Pub. No.: WO2017/144477
PCT Pub. Date: Aug. 31, 2017

(65) Prior Publication Data
US 2019/0053658 A1      Feb. 21, 2019

(30) Foreign Application Priority Data
Feb. 25, 2016   (FR) ...................................... 1651556

(51) Int. Cl.
*A47J 31/40*       (2006.01)
*A47J 31/41*       (2006.01)
(Continued)

(52) U.S. Cl.
CPC .......... *A47J 31/407* (2013.01); *A47J 31/402* (2013.01); *A47J 31/41* (2013.01); *A47J 43/27* (2013.01);
(Continued)

(58) Field of Classification Search
CPC ........ A47J 31/407; A47J 31/402; A47J 31/41; A47J 43/27; A47J 31/057; A47J 31/04;
(Continued)

(56) References Cited

U.S. PATENT DOCUMENTS 9,652,756 B2 *   5/2017   Knecht ................ B67D 1/0892
2012/0111887 A1   5/2012   Smeller et al.
(Continued)

FOREIGN PATENT DOCUMENTS

WO        2007120047 A2    10/2007

OTHER PUBLICATIONS

Corresponding International Application, Application No. PCT/EP2017/053955, International Search Report, dated May 8, 2017, 4 pages.

*Primary Examiner* — Phuong T Nguyen
*Assistant Examiner* — Yeong Juen Thong
(74) *Attorney, Agent, or Firm* — Cooper Legal Group, LLC; Ronald M. Kachmarik

(57) ABSTRACT

A machine for making an individual drink. The machine includes a pressure source, a store defining a plurality of housings, a plurality of removable containers each immobilized, in a service position, in a respective housing. Each container includes a receptacle containing an ingredient, and an upstream emptying valve allowing the ingredient to be caused to exit to the outside of the receptacle by an increased pressure generated inside the receptacle by the pressure source. The machine includes a chamber to receive the ingredients extracted from the containers, via the upstream emptying one-way valves, because of the increased pressure, so as to make the drink. The machine includes a control module able to command the increased pressures in the containers as a function of a desired composition for the drink.

15 Claims, 6 Drawing Sheets

(51) Int. Cl.
    *A47J 43/27*   (2006.01)
    *B65D 85/72*   (2006.01)
    *B67D 1/08*    (2006.01)
    *B67D 1/00*    (2006.01)
    *B67D 3/00*    (2006.01)
    *B67D 1/12*    (2006.01)
    *B67D 1/04*    (2006.01)

(52) U.S. Cl.
    CPC .......... *B65D 85/72* (2013.01); *B67D 1/0078* (2013.01); *B67D 1/0085* (2013.01); *B67D 1/0801* (2013.01); *B67D 1/0804* (2013.01); *B67D 1/0807* (2013.01); *B67D 1/1284* (2013.01); *B67D 3/0087* (2013.01); *B67D 1/0036* (2013.01); *B67D 1/0047* (2013.01); *B67D 1/0431* (2013.01); *B67D 1/0437* (2013.01); *B67D 1/0888* (2013.01); *B67D 3/0009* (2013.01); *B67D 3/0045* (2013.01); *B67D 2001/0091* (2013.01); *B67D 2001/0098* (2013.01); *B67D 2001/0811* (2013.01)

(58) Field of Classification Search
    CPC .... B65D 85/72; B67D 1/0078; B67D 1/0085; B67D 1/0801; B67D 1/0804; B67D 1/0807; B67D 1/1284; B67D 3/0087; B67D 1/0036; B67D 1/0047; B67D 1/0431; B67D 1/0437; B67D 1/0888; B67D 3/0009; B67D 3/0045; B67D 2001/0091; B67D 2001/0098; B67D 2001/0811
    USPC ......... 99/280, 282–284, 295, 300, 304, 307, 99/309
    See application file for complete search history.

(56) References Cited

U.S. PATENT DOCUMENTS

| | | | |
|---|---|---|---|
| 2013/0062366 A1* | 3/2013 | Tansey | B67D 1/0021 222/102 |
| 2013/0129870 A1 | 5/2013 | Novak et al. | |
| 2015/0351584 A1* | 12/2015 | Engels | A47J 31/0652 426/431 |
| 2015/0359380 A1* | 12/2015 | Oleksy | A47J 31/462 426/433 |
| 2016/0068292 A1* | 3/2016 | Fries | B65B 51/10 53/559 |
| 2016/0251104 A1* | 9/2016 | Zweifel | B65D 1/023 215/40 |
| 2017/0055760 A1* | 3/2017 | Burrows | F04B 43/02 |
| 2017/0081163 A1* | 3/2017 | Gatipon | B67D 1/0078 |
| 2017/0240400 A1* | 8/2017 | Pellaud | B67D 1/0078 |

* cited by examiner

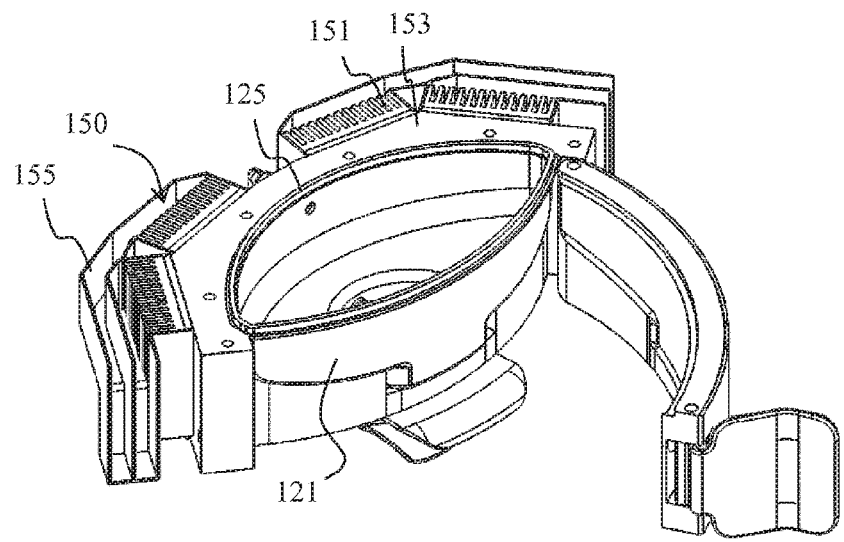
Fig. 5
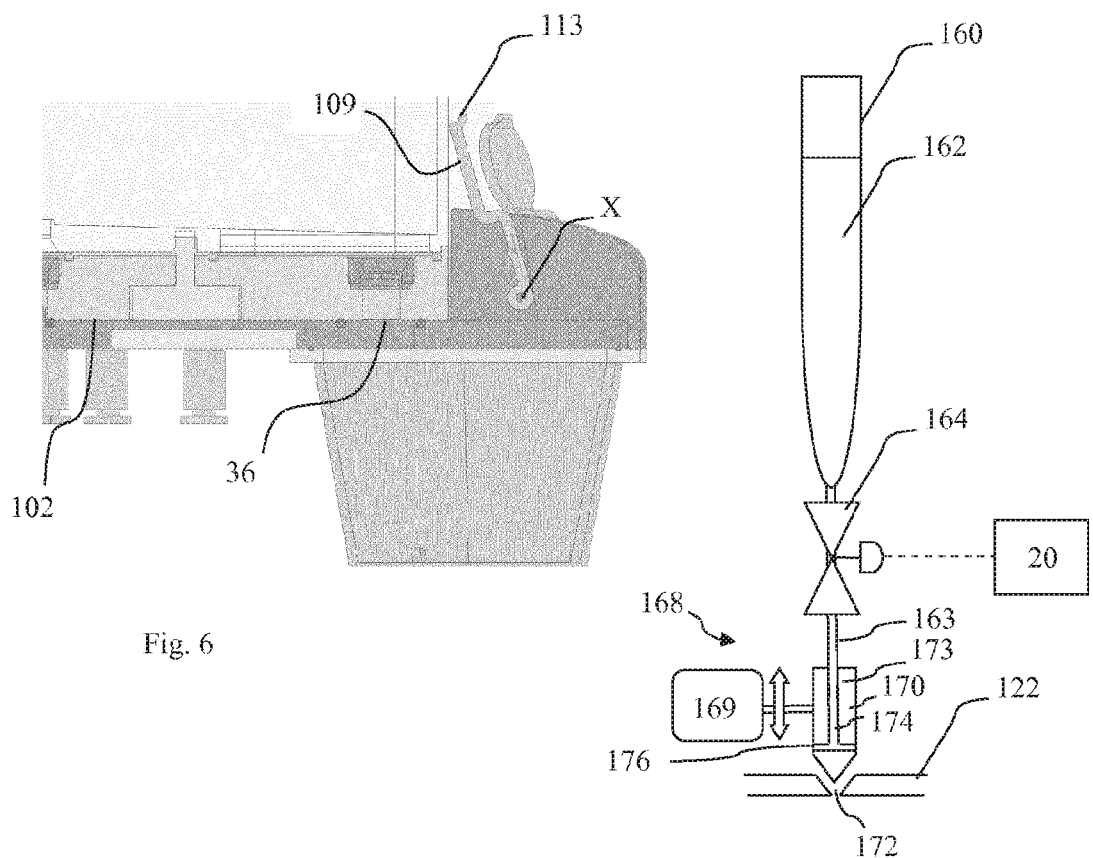
Fig. 6
Fig. 7

APPARATUS FOR MAKING A DRINK

TECHNICAL FIELD

The invention concerns a machine for making an individual drink, and in particular for making cocktails.

PRIOR ART

Machines for making cocktails are commercially available. They allow mixing of ingredients contained in various removable containers in order to create a cocktail.

Hygiene must be irreproachable, however, which necessitates frequent cleaning of the parts in contact with the ingredients. This cleaning is generally laborious or necessitates an additional water container.

Moreover, the ingredients deteriorate rapidly after opening the corresponding containers. It is therefore necessary to change those containers regularly.

Moreover, the time to prepare a drink is generally relatively long.

Finally, each change of ingredient necessitates reconfiguration of the machine.

There therefore exists a need for a new machine for making an individual drink, and in particular a cocktail, enabling the problems mentioned above to be at least partly solved.

An object of the invention is to address this need.

SUMMARY OF THE INVENTION

The invention proposes a machine for making an individual drink, comprising:
- a pressure source,
- a store defining a plurality of housings;
- a plurality of removable containers each immobilized, in a service position, in a respective housing, each container including
  - a receptacle containing an ingredient, and
  - an upstream emptying valve allowing said ingredient to be caused to exit to the outside of the receptacle by an increased pressure generated inside said receptacle by said pressure source;
- a chamber to receive the ingredients extracted from said containers, via the said upstream emptying valves, because of said increased pressure, so as to make said drink;
- a control module able to command said increased pressures in the said containers as a function of a desired composition for said drink.

As will be seen in more detail in the remainder of the description, a machine according to the invention moves the ingredients by increased pressure, which enables the number of parts in contact with the ingredients to be limited. The use of increased pressures also enables rapid and effective cleaning.

Finally, the upstream emptying one-way valve is closed in the absence of increased pressure in the corresponding container, which enables the contact between the ingredient inside the container and the external environment to be limited. That ingredient is advantageously better preserved.

A machine according to the invention may further include one or more of the following optional features:
- each container includes a head fixed to said receptacle, said head including a pressure relief valve allowing entry into the receptacle of fluid, preferably air, coming from said pressure source;
- the head is removable, and preferably screwed onto said container,
- the pressure relief valve has an opening pressure between 100 mbar and 1 bar inclusive, and/or the upstream emptying one-way valve has an opening pressure between 100 mbar and 1 bar inclusive;
- in one embodiment, each housing includes a downstream emptying one-way valve allowing exit of said ingredient because of an increased pressure generated inside said receptacle by said pressure source, the downstream emptying one-way valve being disposed downstream of the upstream emptying one-way valve, with reference to the direction of flow of the ingredient exiting the receptacle;
- the downstream emptying one-way valve has an opening pressure lower than that of the upstream emptying one-way valve;
- the intermediate volume between the upstream and downstream emptying one-way valves is less than 5 cm$^3$;
- in one embodiment, the machine includes a stopper mobile between a disengaged position and a closing position in which it respectively allows or prevents flow by gravity of the ingredient from said receptacle to said chamber;
- the stopper is shaped to allow the placing of a container in said housing only when it is in the disengaged position;
- in the disengaged position of the stopper, each upstream emptying one-way valve opens directly above said chamber, so that an ingredient exiting said downstream emptying one-way valve drops directly into said chamber,
- an ingredient exiting a receptacle preferably travels a distance less than 10 cm, preferably less than 5 cm, preferably less than 2 cm before dropping freely into said chamber;
- an ingredient exiting a container preferably does not transit via any pipe before dropping into said chamber,
- the chamber includes a tilling orifice, preferably a single filling orifice, selectively closable, that is to say the opening and the closing of which are controlled, preferably by the control module, said filling orifice opening above a location for receiving a glass;
- the filling orifice is closable electrically or by an increased pressure;
- the machine includes means for retaining said stopper in the closing position when the housing is not occupied by a container;
- the machine includes magnetic means for retaining the stopper in the closing position in the absence of a container in said housing;
- the machine includes a circuit for depressurizing the chamber, said depressurization circuit including a depressurization line establishing fluid communication of the chamber with a pressure sink, a depressurization valve, controlled by the control module, being inserted into said depressurization line;
- the machine includes a compressor an inlet of which constitutes a pressure sink and an outlet constitutes a pressure source;
- each receptacle includes a wall having a thickness more than 1 mm, preferably more than 1.5 mm, and/or has an interior volume less than 1 l, preferably less than 0.5 l;
- the machine includes, for each housing, magnetic coupling means between said housing and a container disposed in said housing;

the machine includes a module for chilling the ingredients in said chamber;

the machine includes a sensor able to detect the presence of a person less than 15 m from the machine, the control module being programmed to command said increased pressures in said containers as a function of a composition required for said drink and to activate the chiller module following detection by said detector, the sensor is able to detect a signal emitted by an electronic device, in particular to establish or to maintain a computer connection, in particular by Wifi or Bluetooth, in particular a connection of a remote controller of said machine or a mobile telephone;

the chiller module includes a Peltier module;

the chamber defines a preferably removable bowl to receive ingredients exiting the containers and the chiller module preferably has a surface of substantially complementary shape to the shape of said bowl;

the chiller module is in contact with the bowl over more than 50% of the exterior surface of the bowl;

the chiller module is in contact with the bowl over more than 80% of the exterior surface of the bowl;

the chiller module includes a preferably removable capsule containing a fluid, preferably nitrogen or $CO_2$, under pressure, preferably in liquid form, and a chiller valve, controlled by the control module, selectively to allow or to prevent escape of said fluid from the capsule;

the machine preferably includes a conduit for guiding the fluid escaping from the capsule to the interior of said chamber, a conduit consisting of any means enabling guidance of the fluid, and in particular one or more rigid or flexible tubes, or one or more openings formed through components of the machine;

said conduit preferably discharges via an opening disposed less than 50 mm, preferably less than 40 mm, preferably less than 30 mm, preferably less than 20 mm, preferably less than 10 mm from the bottom of said chamber;

the machine preferably includes a filler valve, preferably controlled by the control module, selectively establishing fluid communication between the interior and the exterior of said chamber;

said conduit is preferably at least in part formed in a closure member of the filler valve;

the machine includes means for mixing the ingredients in the chamber, the control module being programmed to activate said means as a function of the activation of the chiller module;

the machine includes a remote controller, preferably a telephone provided with a dedicated application, adapted to configure the control module and/or to transmit a recipe to the control module;

each container is provided with a marker, preferably an NFC marker, the machine including a reader able to read and/or to write in said marker, preferably remotely, information relating to the use of said container, and in particular relating to the level of filling and/or the frequency of use and/or the dates of use, the machine preferably also including an interface enabling display of some or all of said information;

said marker is fixed to the receptacle of said container.

Definitions

The "service" position is a position in which the containers are disposed in their respective housings.

In the present description, there are distinguished a "one-way valve", the closure member of which, classically a flexible membrane, for example a silicon membrane, is opened by a differential pressure higher than an opening pressure and is closed of itself when the differential pressure is lower than the opening pressure, and a "valve", the opening and the closing of which are controlled by the control module. A "one-way valve" is sometimes also referred to as a "check valve". Unless otherwise indicated, the one-way valves of a machine according to the invention are preferably of "cross-slit" type.

The "upstream" and "downstream" positions are defined relative to the flow of the ingredient.

A "coupler" is a member of a housing allowing a fluid connection between the interior of a container housed in that housing and the chamber.

BRIEF DESCRIPTION OF THE FIGURES

Other features and advantages of the invention will become more apparent on reading the following detailed description and examining the appended drawings, in which.

Figure 2:
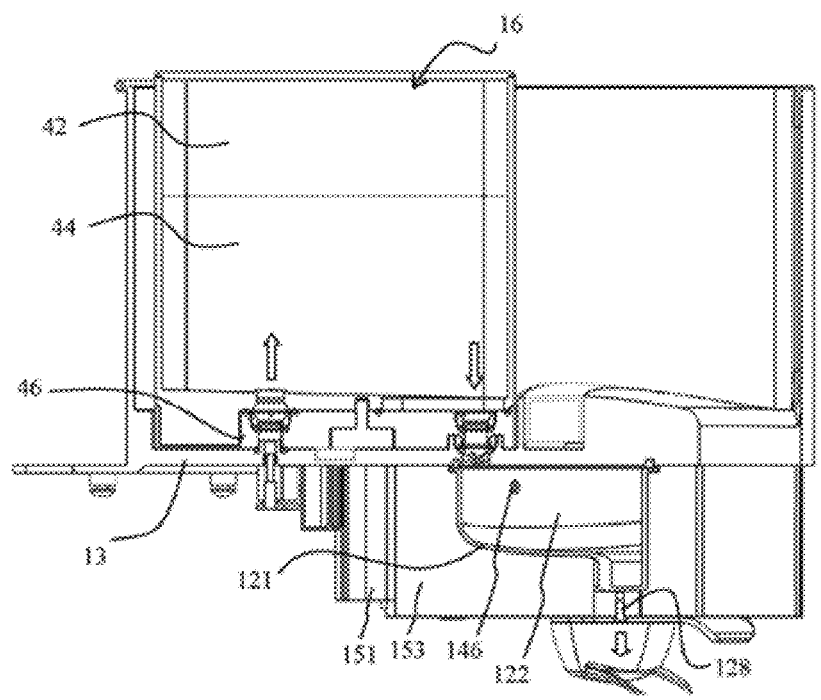
FIG. 2 represents a detail of a machine according to a preferred embodiment of the invention, in section.
Figure 3A:
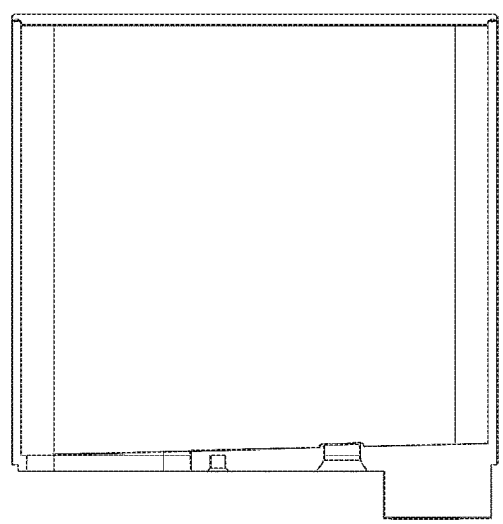
FIG. 3 represents an example of a container that can be used in the machine according to the invention from FIG. 2, and in particular the receptacle of the container in median longitudinal section (FIG. 3a)
Figure 3B:
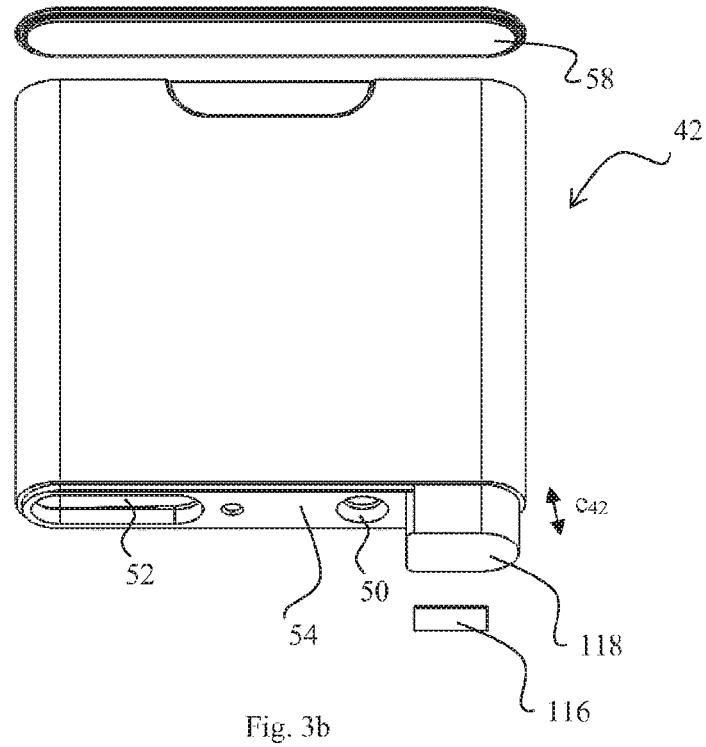
Figure 3C:
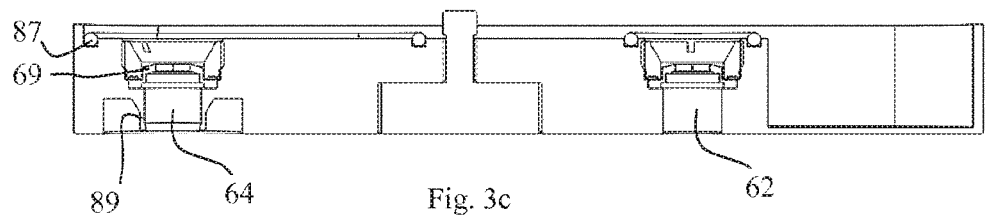
Figure 3D:
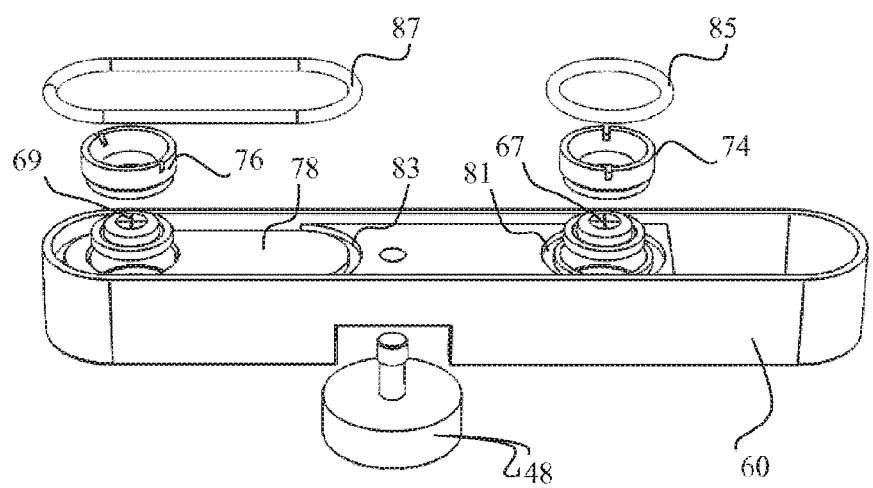
Figure 3E:
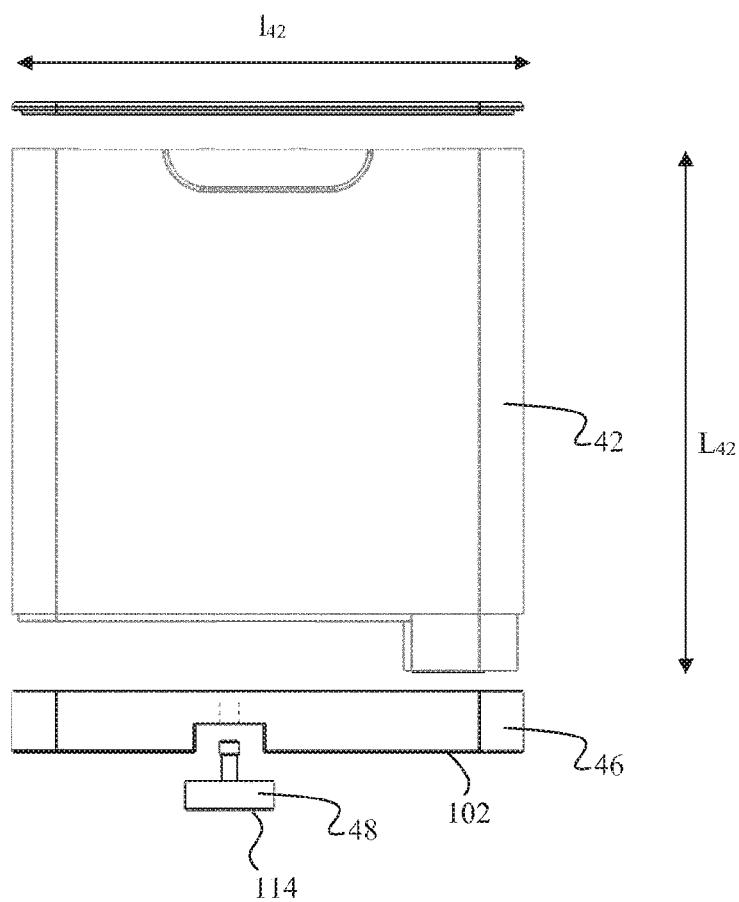
Figure 3F:
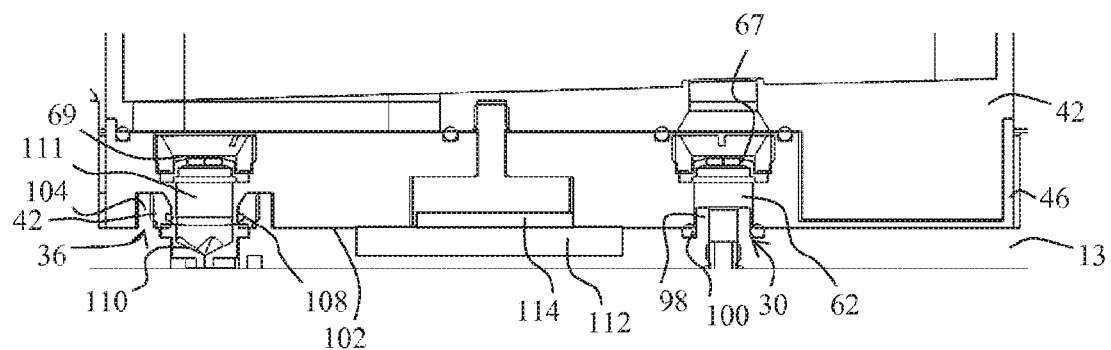
Figure 3G:
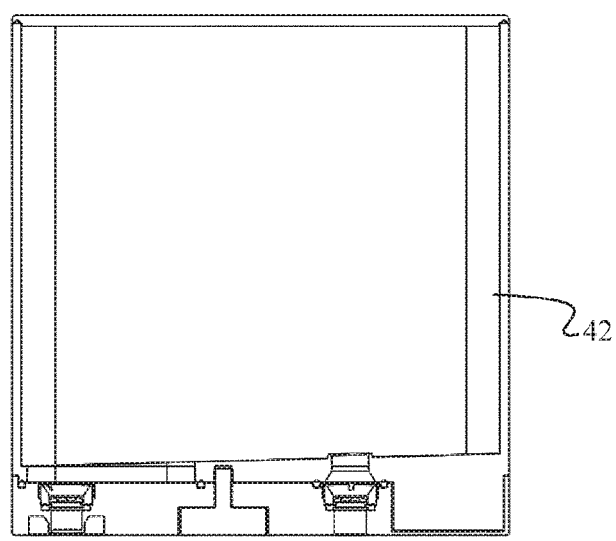
Figure 4A:
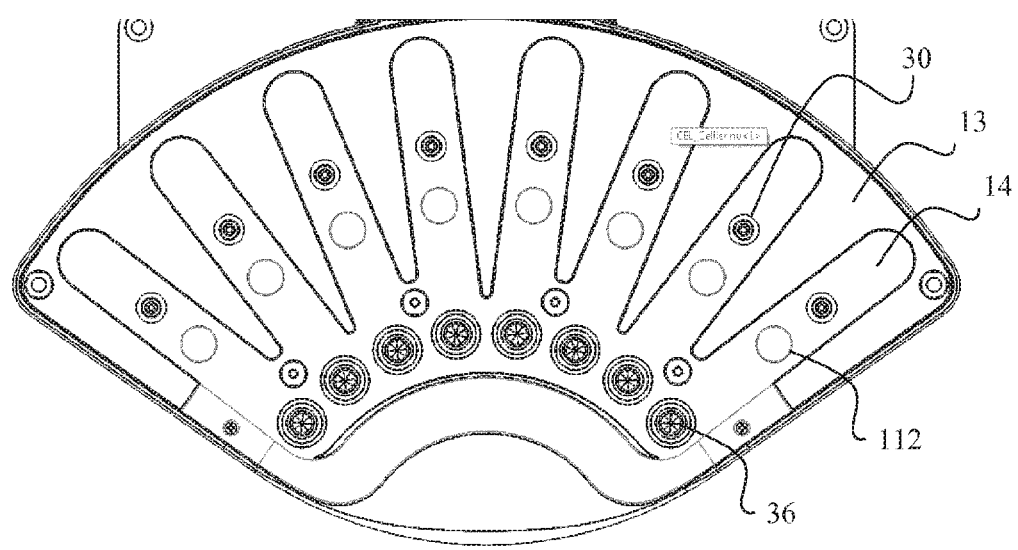
Figure 4B:
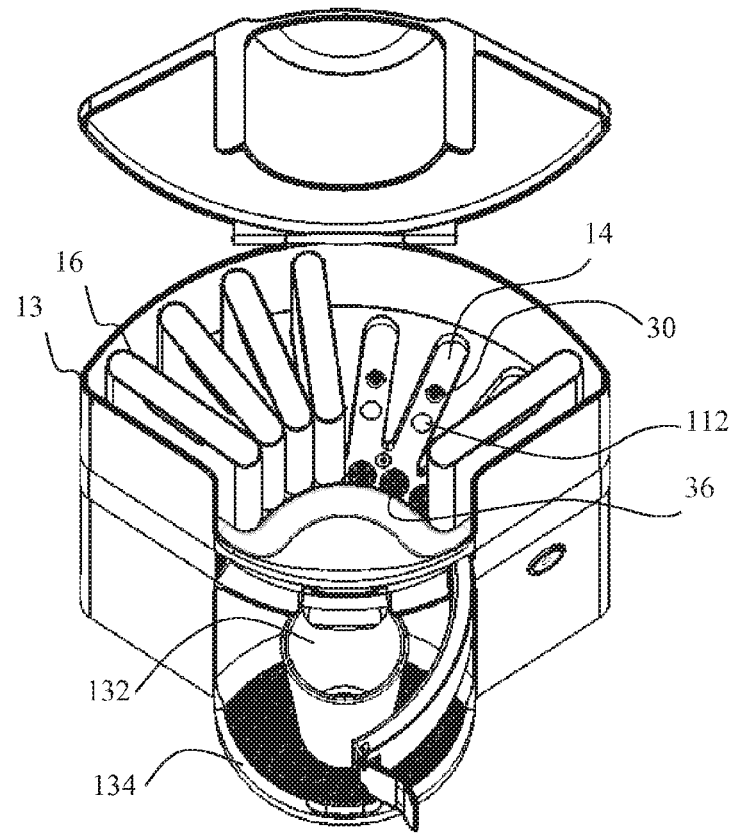

the receptacle of the container in exploded view (FIG. 3b);

the head of the container in median longitudinal section (FIG. 3c);

the head of the container in exploded view (FIG. 3d);

the container, in exploded front view (FIG. 3e);

a detail of the container in median longitudinal section, the container being assembled to the store (FIG. 3f);

the container in median longitudinal section (FIG. 3g);

FIGS. 4a and 4b represent the store of the machine from FIG. 2 respectively as seen from above (partial view) and in perspective;

FIG. 5 represents the funnel and the chiller module of the machine from FIG. 2;

FIG. 6 represents a detail of a machine according to a preferred embodiment of the invention, in section:

FIG. 7 is a diagram representing the operating principle of a filler valve able to convey a chiller fluid.

The various components of a machine according to the invention are described with reference to a service position in which the machine is disposed on a horizontal floor and ready to make a drink. The adjectives "upper" and "lower" refer to this position.

DETAILED DESCRIPTION

General

Figure 1:
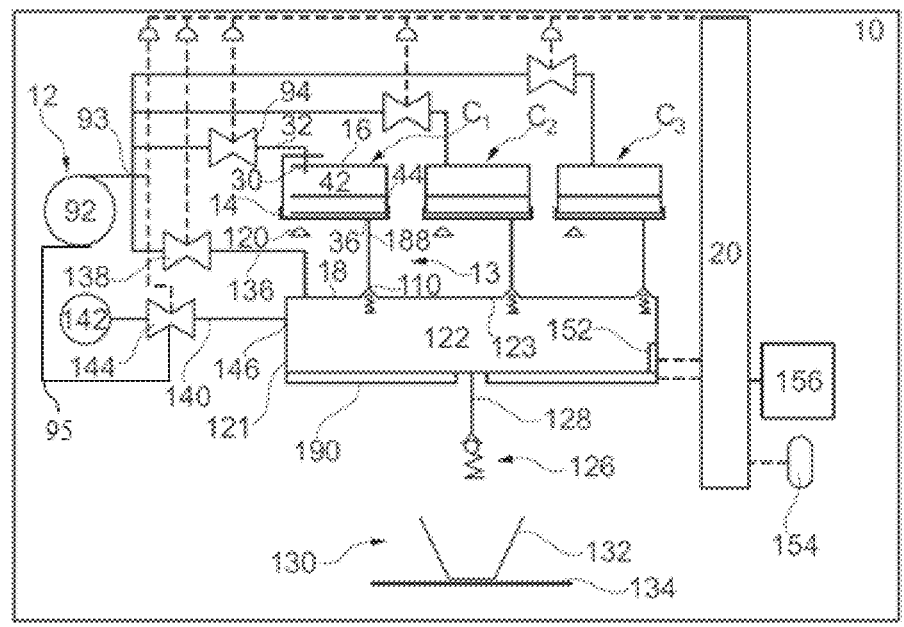
FIG. 1 is a diagram representing a machine according to the invention.

FIG. 1 represents a machine 10 according to the invention for making an individual drink, that is to say a glass of drink.

The machine 10 includes a pressure source 12, a store 13 having a plurality of housings 14, a plurality of containers 16, also known as "pods", each container 16 being disposed in a corresponding housing 14, a funnel 18 enabling mixing of the various ingredients of the drink, and a control module 20.

The circuit enabling filling of the funnel with an ingredient initially contained in a container is similar regardless of the container concerned. In FIG. 1, in a nonlimiting manner, three circuits $C_1$, $C_2$ and $C_3$ have been represented. In the remainder of the description, only one of these circuits ($C_1$) is therefore described. To this end, generic references, with no subscript, are used.

Store

Each housing 14 is preferably of substantially complementary shape to the lower part of a container, so as to be able to receive and to immobilize in position said container.

The machine preferably includes more than three, more than four, more than five, more than six, more than seven, and/or fewer than twenty, fewer than fifteen, or even fewer than ten housings, preferably fewer than eight housings, preferably six housings.

All the housings 14 are preferably adjacent one another. The shortest distance between two adjacent housings is preferably less than 5 cm, preferably less than 3 cm. This improves the compactness of the machine.

Each housing 14 includes a pressurization coupler 30 connected to a pressurization line 32 and enabling the pressure inside the corresponding container 16 to be increased.

The containers and the pressurization couplers are configured to allow a plurality of disconnections and reconnections of the same container to the same pressurization coupler without degrading the container. The user is therefore able easily to replace one ingredient by another.

Each housing 14 also includes an emptying coupler 36 through which the ingredient can be extracted from the container 16.

The housings into which the containers are introduced preferably have an elongate shape.

The emptying coupler 36 of a housing is preferably disposed at one end of said housing. All the emptying couplers of the various housings are more preferably disposed in the vicinity of one another. The maximum distance between two adjacent emptying couplers is preferably less than 5 cm, preferably less than 3 cm.

Containers

The containers 16 are removable, that is to say they can be extracted from the housings, and then replaced in the housings, in the service position, as often as required.

All the containers are preferably identical. They may contain identical or different ingredients. At least two containers preferably contain different ingredients.

A container 16 includes a receptacle 42 defining a volume in which is disposed an ingredient 44, and a head 46, fixed to the receptacle 42.

A receptacle 42 preferably has an interior volume more than 0.1 liter, preferably more than 0.2 liter, and/or less than 1.5 liter, preferably less than 1 liter, preferably less than 0.5 liter. It preferably has a flat substantially parallelepipedal general shape, as shown in FIG. 2a. The length $L_{42}$ of a receptacle 42 is preferably more than 80 mm and/or less than 150 mm, preferably less than 130 mm. The thickness $e_{42}$ of a receptacle 42 is preferably more than 10 mm and/or less than 30 mm. The width $l_{42}$ of a receptacle 42 is preferably more than 100 mm, preferably more than 110 mm and/or less than 150 mm, preferably less than 130 mm.

The wall of a receptacle 42 may be made of any "food grade" material appropriate to the ingredient 44 contained in the receptacle. The container may be for single use, that is to say not refillable or reusable. The material of the wall of the receptacle 42 is preferably a plastic when the container is reusable. When the container is for single use, said material is preferably a plastic or includes or even consists of a fibrous, preferably cellulose-based, material such as paper or card. The thickness of the wall is preferably more than 1 mm, preferably more than 1.5 mm, so that the receptacle is rigid. The stiffness is preferably such that it is not possible to cause the ingredient 44 to exit merely by applying manual pressure to the receptacle 42.

The receptacle 42 defines a closed volume, which constitutes the "interior" of the container. The receptacle 42 opens to the outside only via a pressurization orifice 50 and an emptying orifice 52 which, in the service position, are selectively in fluid communication with the pressurization coupler 30 and the emptying coupler 36 of the corresponding housing, respectively.

When the receptacle 42 is for single use, the pressurization orifice 50 and the emptying orifice 52 are, before use of the receptacle, preferably closed temporarily by means of a removable film, removed before the receptacle 42 is coupled to the head 46. The pressurization and emptying orifices preferably open onto the lower face 54 of the receptacle 42.

In one embodiment, the receptacle 42 has a lid 58. The lid 58 is preferably removable, which enables refilling of the receptacle.

The head 46 is fixed to the lower part of the receptacle 42.

In one embodiment, the head 46 is removably fixed to the receptacle 42, for example by a system of screws 48 or clips. The head 46 can advantageously be used for a plurality of receptacles 42, which is particularly useful when the receptacle 42 is for single use.

The head 46 includes a casing 60, preferably made of rigid plastic, defining a pressurization conduit 62 and an emptying conduit 64, closed by a pressure relief valve 67 and an upstream emptying one-way valve 69, respectively, fixed to the casing 60, for example, by means of a pressurization flange 74 and an emptying flange 76, respectively.

The one-way valves can be fixed by any means, for example by sticking or clipping them to the casing 60.

The pressurization and emptying conduits open, on the upstream side, that is to say on the container side, onto an upper face 78 provided with grooves 81 and 83. Seals 85 and 87 are inserted in the grooves 81 and 83, respectively, and in the position with the head 46 assembled onto the receptacle 42, come to bear, in fluid-tight manner, on the lower face 54 of the receptacle 42. Merely screwing the head 46 onto the receptacle 42 is preferably sufficient to compress the seals 85 and 87 and to make the seal.

The emptying conduit 64 of the casing 60 ends, in the lower part, in the form of a nipple 89.

The concept of a head 46 independent of the receptacle 42 advantageously enables manufacture of containers 16 at lower cost, and use of single-use receptacles 42.

Container Pressurization Circuit

The pressure source 12 is in particular intended to increase the pressure inside the containers 16 to extract the ingredient therefrom to pour it into the funnel.

The pressure source 12 preferably includes a compressor 92, preferably an air compressor, an outlet 93 of which is connected to pressurization circuits of the containers 16 and to the funnel 18.

The pressurization circuit of a container includes a pressurization line 32 establishing fluid communication between the outlet 93 of the compressor 92 and the interior of the container. A pressurization valve 94 is inserted in each pressurization line 32 of a container.

The pressurization coupler 30 includes a pressurization nozzle 98, of substantially complementary shape to the pressurization conduit 62 of the head of the container and which, in the service position, penetrates inside the pressurization conduit 62. The pressurization nozzle 98 has around it a groove receiving a seal 100, so that, in the service position, the lower face 102 of the head 46 can bear, in fluid-tight manner, on the seal 100.

The pressure relief valve 67 of the head of the container is oriented so as to be opened by an increased pressure relative to the exterior of the receptacle. This increased pressure, also known as the opening pressure $\Delta P_{67}$, is preferably between 100 mbar and 1 bar inclusive.

The compressed air circulating in the pressurization line 32 can therefore circulate, without leaking, as far as the pressure relief valve 67 and open it when the pressure inside the receptacle 42 is significantly lower than the pressure of the compressed air.

In a preferred embodiment, the pressure relief valve is a mechanical one-way valve including a closure member pushed against its seat by an elastic means, preferably a spring.

Container Emptying Circuit

The emptying coupler 36 includes an emptying nozzle 104, in the form of a sleeve, into which the nipple 89 defined by the casing 60 can be introduced. Externally, the nipple 89 has a shape substantially complementary to the interior shape of the emptying nozzle 104. A groove is formed inside the emptying nozzle 104 and receives a seal 108. The emptying nozzle and the nipple are shaped so that, when the nipple is introduced into the emptying nozzle, it compresses the seal 108, so as to provide a fluid-tight contact.

The emptying coupler 36 of the housing is provided with a downstream emptying one-way valve 110. The upstream emptying one-way valve 69 and the downstream emptying one-way valve 110 are oriented to be opened by an increased pressure relative to the interior of the receptacle 42. The opening pressures $\Delta P_{69}$ and $\Delta P_{110}$ are the pressure differences allowing this opening and are preferably between 100 mbar and 1 bar inclusive. More preferably, the opening pressure $\Delta P_{110}$ is lower than the opening pressure $\Delta P_{69}$, the ratio $\Delta P_{69}/\Delta P_{110}$ between these opening pressures preferably being more than 1.05, preferably more than 1.10, preferably more than 1.15. When the upstream emptying one-way valve 69 opens, the downstream emptying one-way valve 110 likewise opens immediately. On the other hand, in the event of limited depressurization downstream of the downstream emptying one-way valve, the downstream emptying one-way valve 110 may open without the upstream emptying one-way valve 69 opening. It is therefore possible to evacuate a residue of ingredient contained in the intermediate volume 111 between the upstream emptying one-way valve 69 and the downstream emptying one-way valve 110.

The intermediate volume 112 is preferably less than 10 cm$^3$, preferably less than 5 cm$^3$, preferably less than 3 cm$^3$, preferably less than 2 cm$^3$.

In the absence of a container on a housing, the corresponding downstream emptying one-way valve 110 remains closed. The absence of a container advantageously does not modify the operation of the machine 10. Moreover, the chamber of the funnel, described hereinafter, continues to be isolated from the external environment, which improves hygiene.

The length of the drainer coupler, measured in the direction of flow of the ingredient, is preferably less than 5 cm, preferably less than 3 cm, preferably less than 2 cm. The ingredient advantageously travels a short distance, preferably less than 5 cm, less than 3 cm, less than 2 cm before dropping freely into the chamber. Hygiene is therefore optimal.

In one embodiment, the downstream emptying one-way valve 110 is replaced by a stopper 109 that closes, in fluid-tight manner, the emptying coupling 36 of the housing in the absence of a container in said housing, in a closing position. The stopper 109 is shaped so as to remain in the closing position regardless of the downstream pressure, and in particular when the pressure in the chamber is increased to fill the glass, as described hereinafter.

This retention in the closing position may result from the weight of the stopper, or, preferably, from locking or from the application of a magnetic attraction force.

The stopper 109 can be disengaged from the emptying coupler 36, so as no longer to block the passage of liquid through the drainage one-way valve (disengaged position). In the disengaged position, it may in particular rest on the container, as represented in FIG. 6.

The stopper is preferably shaped so that positioning a container in a housing is possible only after disengaging the stopper.

The stopper is preferably attached to the store, preferably mounted on the store to rotate about a preferably substantially horizontal axis X between the closing and disengaged positions.

The stopper is preferably a substantially flat paddle, as represented in FIG. 6.

The stopper is more preferably provided with a handle 113 facilitating its manipulation by the user.

Container and Housing Coupling Means

The container 16 and the corresponding housing 14 preferably include coupling means providing the seal by means of the seals 100 and 108. The coupling may be effected by any means. The coupling is preferably magnetic. In a preferred embodiment, the housing 14 includes a magnet 112 and the container 16 includes metal, for example in the form of a metal insert 114, disposed so as to be attracted by the magnet 112 in the service position. The attraction between the magnet 112 and the metal insert 114 advantageously enables the container 16 to be pressed into the housing 14, thus compressing the seals 100 and 108. The use of coupling means advantageously enables good control of the pressure between the container 16 and the housing 14, and therefore prevention of uncontrolled deformation, in particular of the membranes of the one-way valves.

Container and Store Communication Means

Each container 16 further carries a marker 116, also known as a "tag", preferably of NFC type, preferably fixed to the head 46. The marker 116 is preferably fixed to the lower face 54 of the receptacle 42 or to the lower wall of the head 46, on the side opposite the lower face of the head 46. The marker 116 is advantageously protected.

The marker 116 preferably contains information on the ingredient 44 contained in the container, for example on its composition, its volume, its density, its source, the number of calories that it adds or its use by date.

The machine 10 further includes a reader 120, disposed so as to read the marker 116. Communication between the marker 116 and the reader 120 is preferably contactless, preferably by NFC (near field communication).

In one embodiment, the receptacle 42 includes an excrescence 118, that projects from the lower face 54 of the receptacle 42. The marker 116 is preferably fixed to this excrescence, so that, in the assembled position, it extends in the vicinity of the lower face 102 of the head 46. This facilitates exchanges of information between the marker 116 and the reader 120.

The reader 120 is preferably also capable of writing the marker 116. It is preferably capable of writing on the marker 116 information relating to the use of the container 16, for example relating to the quantity of ingredient already extracted from the container, or to the date of first use of the container.

The reader 120 is preferably in communication with the control module 20. The control module 20 can advantageously inform the user of the necessity to change a container or to prepare for the next replacement of the container, but also to advise on the use by date of the ingredient contained in the container.

The recording of information on the marker 116 by the reader 120 advantageously also enables tracing of this information, even if the container is extracted from its housing, for example to be used in another machine. This considerably reduces the sanitary risks and enhances the quality of the information supplied to users.

Finally, the marker advantageously enables the control module 20 to tell the content of and the housing occupied by the container, without the user of the machine having to configure it for this purpose.

Funnel and Glass Filling Circuit

With the store 13, the funnel 18 defines a sealed chamber 122. The chamber 122 defines a bowl 121 into which the ingredients exiting the emptying orifices 36 of the housings are decanted, by increasing the pressure in the receptacles 42.

In a preferred embodiment, the bowl 121 is disposed immediately under the emptying couplers 36. Each emptying coupler 36 preferably opens on the downstream side directly into the funnel, so that an ingredient exiting via the downstream emptying one-way valve 110 drops directly into the bowl 121, without passing through a conduit such as a flexible or rigid tube. Hygiene is then optimal.

More preferably, the chamber 122 is defined by the bowl 121 and by the store 13, resting on the bowl 121, like a lid. The lower face 123 of the store preferably includes a groove in which a seal is disposed. This groove is such that this seal bears in fluid-tight manner on the upper edge 125 of the bowl 121.

More preferably, the bowl 121 is pressed against the store by magnetic means, the force of attraction being sufficient to compress the seal.

The bowl 121 of the funnel is preferably removable so that it can be cleaned.

The funnel 18 further includes a selectively closable filling orifice, preferably a filling one-way valve 126, controlled by the control module 20. The filling one-way valve 126 is inserted into a filling line 128 opening at the bottom of the chamber 122 at one end and, at the other end, above a location 130 to receive a glass 132 to be filled. The machine 10 preferably includes a support 134 defining the location 130 on which the glass 132 must be placed. The filling line 128 allows the mixture contained in the chamber 122 to flow toward the glass 132, because of an increased pressure in the chamber 122. The filling line 128 is preferably of substantially zero length, the filling one-way valve 126 being integrated into the bottom of the chamber 122.

Funnel Pressurization Circuit

The funnel chamber pressurization circuit includes a pressurization line 136 establishing fluid communication between the outlet 93 of the compressor 92 and the interior of the chamber 122. A pressurization valve 138 is inserted in the pressurization line 136.

Funnel Depressurization Circuit

The machine includes a circuit for depressurizing the funnel.

The funnel depressurization circuit includes a depressurization line 140 establishing fluid communication between the interior of the chamber 122 and a pressure sink 142, for example atmospheric pressure. A depressurization valve 144, controlled by the control module 20, is inserted into the depressurization line.

In a preferred embodiment, the pressure sink 142 is the compressor 92. Throughout the phase of filling the chamber 122, air can advantageously circulate, in a closed circuit, between the compressor, the containers 42 and the chamber 122.

In a preferred embodiment, the depressurization circuit 144 of the chamber 122 also enables aspiration of any deposits, in particular between the upstream emptying one-way valve 69 and the downstream emptying one-way valve 110, so that these deposits drop into the chamber 122.

The depressurization line 140 preferably opens, at the upstream end, into the chamber 122 through an opening 146 situated at a high point of the chamber 122, so that the mixture of ingredients contained in the chamber 122 cannot be aspirated by the depressurization line if the depressurization valve is open.

Stirring Circuit

The machine preferably further includes a stirring circuit, not represented, enabling injection of air under pressure into the mixture of ingredients in the chamber. The stirring circuit preferably includes a pressure source, for example the compressor 92, and a stirring line provided with a stirring valve, preferably controlled by the control module 20, and establishing communication between the chamber and the pressure source.

The stirring circuit preferably enables emulsification of the mixture present in the chamber, and, if necessary, speeding up of the chilling thereof. In one embodiment, the stirring circuit and the pressurization circuit of the chamber 122 may be one and the same.

Chiller Module

The machine 10 preferably further includes a chiller module 150, preferably disposed so as to chill the chamber 122. The chiller module 150 is preferably controlled by the control module 20 as a function of temperature measurements effected by means of a temperature sensor 152. It preferably extends under the chamber 122, or even defines pan of the chamber 122. In the service position, the bowl 121 is preferably in contact with the chiller module 150. The chiller module 150 preferably has a surface of substantially complementary shape to the shape of the bowl 121, so that, in the service position, there is close contact between the chiller module 150 and the bowl 121, and contact is preferably made over more than 50%, more than 80%, or even substantially 100% of the exterior surface of the bowl 121.

In a first preferred embodiment, the chiller module includes one and preferably a plurality of Peltier module(s) 151, preferably provided with a radiator on the side opposite the bowl 121. Heat is preferably evacuated from these radiators to the outside via a network of pipes 155.

In this first preferred embodiment, the chiller module preferably includes a, preferably aluminum, temperature diffuser 153 itself chilled by a Peltier module.

In a second preferred embodiment, the chiller module includes a capsule 160 containing a fluid 162 at a pressure preferably higher than 5 bar, higher than 10 bar or higher than 15 bar, preferably around 20 bar. The fluid inside the capsule may be in gas form or, preferably, in liquid form. The fluid is preferably carbon dioxide or nitrogen.

The machine includes a chiller line 163 provided with a chiller valve 164 controlled by the control module 20, so as to be able selectively to establish fluid communication of the fluid 162 with the outside of the capsule, preferably with atmospheric pressure. Opening the chiller valve 164 therefore brings about the expansion of the fluid 162 and therefore the production of frigories.

The capsule 160 is preferably removable so that it can be replaced. The capsule may for example be screwed on, preferably in the vicinity of the chamber 122, preferably onto the chamber 122.

The interior volume of the capsule is preferably more than 10 cm$^2$ and less than 100 cm$^2$.

The chiller valve 164 may be fixed to a neck of the capsule, for example by clipping it on, preferably by screwing it on.

Control Module

The control module 20 conventionally includes a processor and a memory containing code instructions for causing the processor to function, in particular to control the electrical members, and notably the various valves and the compressor.

The control module preferably includes an interface enabling the user to enter control parameters, for example in the form of a choice of drink recipe. The interface is preferably a touch-sensitive screen.

In a preferred embodiment, the control module further includes communication means enabling information to be received via the Internet, for example updates or new recipes.

The memory of the control module 20 preferably includes more than two, more than five, more than ten, or even more than twenty recipes, each recipe corresponding to a series of instructions sent by the control module, as explained hereinafter.

In a preferred embodiment, the machine further includes a remote controller 154 enabling remote interaction with the control module 20, for example to instruct the making of a particular drink or to adjust the composition or the temperature of the drink.

The remote controller 154 is preferably a telephone provided with a dedicated application. The dedicated application preferably enables viewing of the list of recipes and instructing the making of a drink according to a recipe.

In one embodiment, the application transmits the instructions for making the drink to the control module 20.

Presence Sensor

In a particular advantageous embodiment, notably for the first preferred embodiment of the chiller module, the machine 10 further includes a presence sensor 156 enabling the control module to assess if a potential user is in the vicinity of the machine. The sensor 156 can for example detect a Wifi or Bluetooth signal generated by the portable machine of a preferably pre-identified potential user, for example generated by their mobile telephone. It can also detect the setting up of communication between the remote controller 154 and the control module 20, or the mere switching on of the remote controller 154 or the machine.

The control module 20 preferably controls the chiller module 150 without waiting for the making of a drink to be instructed. If a user instructs the making of a drink subsequently, the chamber 122 has advantageously already been chilled. This advantageously speeds up the making of a cold drink.

In one embodiment, after a predetermined time interval, for example after three minutes, the chiller module is again turned off by the control module, which enables a saving of energy.

The presence sensor preferably enables the detection of a potential user only within a radius of less than 15 m, preferably less than 10 m, preferably less than 5 m. This advantageously reduced the number of unnecessary activations of the chiller module, i.e. activations not followed by making a drink.

In the second preferred embodiment of the chiller module, the machine 10 preferably does not include a presence sensor 156, a high production of frigories by expansion being immediate.

Mixer, Gas Injector, Addition of Water

In a preferred embodiment, the machine further includes a mixer, not represented, enabling mixing of the content of the chamber 122. The mixer may be mechanical and be actuated by a motor.

The machine can further include a gas injector, in particular a carbon dioxide injector, known in itself, enabling gasification of the content of the chamber 122, in order to obtain a fizzy drink.

The machine may also include an ice-making module, known in itself, enabling introduction of ice into the glass 132.

Finally, the machine may include a module for adding water enabling water to be added to the chamber and/or, preferably, into the glass 132.

Operation

In the preferred embodiment, the machine 10 functions in the following manner.

Different receptacles 42, containing different ingredients 44, are purchased. The pressurization orifice 50 and the emptying orifice 52 are preferably initially closed by means of a film. The receptacle 42 is therefore fluid-tight and the receptacle can be manipulated easily to be sold commercially, for example in supermarkets. The films are removed or torn before the receptacle is assembled to the head 46. The opening of these orifices may equally result from assembling the receptacle 42 onto the head.

During assembly of the head 46, the seals around the pressurization and upstream emptying one-way valves of the head come to bear, in fluid-tight manner, facing the pressurization orifice 50 and the emptying orifice 52, respectively, of the container 16.

Containers ready for use, already assembled, can also be marketed. The containers are preferably reusable, that is to say can be refilled with ingredient 44, for example by filling via the pressure relief valve 67 and the pressurization orifice 50.

All the containers are disposed in the corresponding housings, in the service position.

In the first preferred embodiment of the chiller module, the stopper 109 is disengaged from the emptying coupler of the housing in which a container must be disposed. The presence of the stopper preferably prevents the placing of the container, which prevents any manipulation error.

Placing a container in a housing results in the magnet 112 of the housing attracting the metal insert 114 of the container 16. The resulting forces of attraction lead to the nipple 89 of the head 46 being pressed against the seal 108 disposed in the emptying nozzle 104 of the housing. The coupling of a container in a housing therefore results in establishing a fluid-tight circuit from the container 42 to the bowl 121 of the funnel via the upstream emptying one-way valve 69, the nipple 89 and, where applicable, the downstream emptying one-way valve 110.

The forces of attraction also result in compression of the seal 100. This results in fluid-tight pressurization coupling from the pressurization coupler 30 of the housing to the pressurization orifice 50 of the receptacle 42.

In the service position, each marker 116 is read by the reader 120, which enables the control module 20 to know that the container is present in the housing, but also, for example, the nature of the ingredient, the residual quantity of ingredient, and the date of first use.

The knowledge of the nature of the ingredient and of the residual quantity of the ingredient in the receptacle advantageously enables placing of the container in any housing. Before commencing the making of a drink, it in fact suffices for the reader to read the markers to know the ingredients available, together with their locations and their quantities.

In particular, when the container is reusable, the user can reprogram the marker on each filling, preferably by means of the reader 120.

When a potential user is in the vicinity of the machine, their presence can be detected by the sensor 156, in particular if they activate the remote controller 154 or if a WIFI or BLUETOOTH signal corresponding to one of their personal devices, for example their mobile telephone, is detected.

In the first preferred embodiment of the chiller module, the control module preferably then activates the chiller module 150, which enables immediate chilling of the chamber 122.

The user can moreover instruct the making of a drink, through interaction with a touch-sensitive screen or buttons of the machine or by means of the remote controller 154. In a preferred embodiment, the control module determines the drinks that the machine is capable of making, as a function of the quantities of ingredients available, and proposes only those drinks to the user, preferably by means of their telephone.

The control module then instructs the decanting into the chamber 122 of the ingredients concerned. To be more precise, to transfer an ingredient 44 from its container 16 to the chamber 122, the control module 20 opens the corresponding pressurization valve 94. The control module 20 also opens the depressurization valve 144 of the chamber. It starts the compressor 92, which enables the injection of air under pressure, through the pressurization coupler 30, the pressure relief valve 67 and the pressurization orifice 50, into the receptacle 42. The pressure inside the receptacle 42 therefore increases. Beyond a threshold, because of this increased pressure, the upstream emptying one-way valve 69 and the downstream emptying one-way valve 110 open and the ingredient 44 can flow into the chamber 122, via the emptying orifice 52, the nipple 89, the emptying one-way valves 69 and 110, and the emptying coupler 36.

The depressurization valve 144 is preferably connected to the inlet of the compressor. During the pressurization phase, the air circuit is therefore advantageously closed. Hygiene is therefore optimal.

The various ingredients may be decanted into the chamber 122 simultaneously or otherwise. They are preferably decanted substantially simultaneously, which speeds up the making of the drink.

The nature of the ingredients and their quantities are determined by means of a recipe stored in the control module 20.

In particular, to make a cocktail, at least two different ingredients are decanted into the chamber.

The quantity of an ingredient decanted may in particular be adjusted by means of the duration of the pressurization of the corresponding receptacle and/or with the value of the pressure imposed in the receptacle.

After dispensing a particular quantity of ingredients 44, as a function of the recipe, the pressurization valves 94 of the containers are all closed. The pressure in the chamber 122 falls and the upstream and downstream emptying one-way valves are closed.

The chamber 122 is preferably then cleaned. To this end, the depressurization source 146 is activated, and the depressurization valve 144 kept open.

When the housing includes a downstream emptying one-way valve 110, the pressure reduction inside the chamber 122 is preferably such that the downstream emptying one-way valve 110 opens, but the upstream emptying one-way valve 69 remains closed. The ingredient contained in the intermediate volume 111 between these two one-way valves can then flow into the chamber 122. A cleaning cycle is preferably effected before the filling one-way valve 126 is opened. The ingredients extracted from the intermediate volume 111 can therefore advantageously be evacuated into the glass 132.

When the housing does not include a downstream emptying one-way valve, but a stopper 109, the emptying coupler 36 of the housing remains permanently disengaged in the presence of a container in said housing. The ingredient passing through the upstream emptying one-way valve can then advantageously flow by gravity into the chamber 122. No cleaning cycle is therefore necessary for cleaning the space downstream of the upstream emptying one-way valve.

Activation of the chiller module 150 chills the ingredients present in the chamber 122. The control module 20 preferably evaluates the temperature of the mixture contained in the chamber 122 by means of the measurement taken by the temperature sensor 152 and regulates the chiller module 150 accordingly.

In the first preferred embodiment of the chiller module, using Peltier modules, the chiller module 150 is preferably activated as soon as the sensor 156 detects the presence of a potential user. The ingredients are therefore decanted into a funnel the temperature of which has already been reduced, which enables considerable acceleration of chilling. The use of Peltier modules and a thermal diffuser in close contact with the bowl of the funnel enables further acceleration of chilling.

In the second preferred embodiment of the chiller module, the chiller module 150 is preferably activated after the ingredients have been decanted into the chamber 122. To this end, the control module 20 commands opening of the chiller valve 164, which enables the fluid 162 contained in the capsule 160 to escape therefrom. This escape leads to a sudden drop in the pressure of the fluid 162, and therefore to the production of frigories. These frigories are preferably transmitted directly to the mixture of ingredients contained in the bowl 121, that is to say that the fluid is preferably injected into the mixture of ingredients contained in the bowl.

Rapid chilling at lower cost is therefore advantageously possible.

Tests have been effected with a mixture including a liquid containing alcohol (between 0° and 70°) and an amount of sugar between 0 and 250 g inclusive. This mixture, disposed in the stainless steel chamber, was initially at 27° C. The fluid ($CO_2$ or nitrogen), initially in the liquid state in the capsule, at approximately 20 bar, was ejected from the capsule into the mixture. This ejection caused expansion of the fluid, which itself chilled the fluid, now become a gas, to approximately −50° C. Injecting the gaseous fluid into the mixture reduced the temperature of the latter to approximately 5° C. in a few seconds.

The stirring valve may be opened in order to inject into the chamber 122 air enabling mixing of the various ingredients, or even creation of an emulsion, but also to facilitate chilling. Alternatively, or in addition, the paddle of a mechanical mixer may be started rotating inside of the chamber.

In one embodiment, a carbon dioxide injector is also employed in order to inject into the mixture contained in the chamber 122 a particular quantity of carbon dioxide in order to obtain a fizzy drink. If necessary, water can also be added to the interior of the chamber 122.

Once the mixture inside the chamber 122 corresponds to the selected recipe and is at the appropriate temperature, the control module 20 instructs closing of the depressurization valve 144 and, where necessary, closing of the stirring valve and the end of injection of carbon dioxide and/or water, so that the chamber 122 is sealed.

The control module 20 then commands opening of the pressurization pressure 138, which enables injection of air under pressure into the chamber 122, and thus opening of the filling one-way valve 126. Because of the pressure of the air injected in this way into the chamber 122, the mixture contained in the chamber 122 flows into the glass 132.

The quantity of an ingredient extracted from a container is recorded, by the reader 120, in the marker 116 of the container. By reading the information contained in the marker, the reader can therefore determine the residual quantity of ingredient and, if necessary, advise the user.

At any time, a container may be removed from its housing. As soon as it is removed, the pressurization valve 67 closes. The ingredient 44 is therefore isolated from the outside, which enables its conservation.

Thanks to the marker, the container may be replaced in any housing.

Extracting a container 16 also leads to closing of the corresponding downstream emptying one-way valve 110. The interior of the chamber 122 advantageously remains isolated from the outside environment, which makes it possible to pressurize it or to depressurize it, and further improves hygiene.

As is now clearly apparent, a machine according to the invention enables a cold drink, in particular a cocktail, to be made very rapidly and precisely. Moreover, the containers can be replaced easily, which offers great flexibility of use. Finally, a machine according to the invention enables extremely rapid chilling of the drink that is made.

A machine according to the invention also enables optimum hygiene, in particular because the circuits for the ingredients are extremely short, and an ingredient can be transferred directly from a container to the chamber 122, and then directly from the chamber 122 to the glass 132, without passing through tubes.

A machine according to the invention advantageously includes no conduit, and in particular no tube, flexible or rigid, between any container and the funnel.

Of course, the invention is not limited to the embodiments described and represented, which are provided by way of illustration only.

In particular, one-way valves can be replaced by valves controlled by the control module. Conversely, valves can be replaced by one-way valves.

For example, the filling one-way valve 126 could be replaced by a filler valve 168 controlled by the control module. Emptying the chamber is therefore advantageously possible without having to pressurize the chamber.

In a most preferred embodiment, as represented in FIG. 7, the filler valve 168 conventionally includes an actuator 169 and a closure member 170, the actuator driving the closure member between closed and open positions, in which it respectively blocks or opens a filling orifice 172 formed in the bottom of the chamber 122.

The closure member 170 is preferably disposed so as to be chilled by the fluid exiting the capsule 160. In particular, the closure member may have an interior opening 174 into which said fluid 162 can be injected.

The capsule and the chilling line 163 are preferably fixed relative to the chamber 122. A fluid-tight sliding contact 173 is preferably provided between the chilling line 163 and the surface of the closure member defining the interior opening 174.

The closure member is preferably made of metal, encouraging the transfer of frigories to the mixture contained in the chamber. In one embodiment, the closure member may be provided with fins in order to favor this transfer.

More preferably, the interior opening 174 opens into the chamber, preferably in such a manner that the fluid passes through the the mixture of ingredients contained in the chamber. The interior opening 174 preferably opens at the lower end of the closure member through one or more injection orifices 176. The injection orifice or orifices 176 are preferably less than 20 mm, preferably less than 10 mm from the bottom of the chamber in the closed position of the closure member. This increases the duration of contact between the fluid and the mixture of ingredients contained in the chamber.

The direction of injection is again preferably substantially radial, relative to the axis of the filling orifice 172. The injection direction is preferably substantially parallel to the bottom of the chamber, as presented in FIG. 7. The duration of contact between the fluid and the mixture of ingredients contained in the chamber is further increased by this. Moreover, the injection of the fluid contributes to the mixing of the ingredients.

The closure member 170 therefore advantageously exerts not only the function of selective blocking of the filling orifice 172, but also a radiator and/or chiller fluid conduit function. This improves the compactness and the simplicity of the machine.

The invention claimed is:

1. A machine for making an individual drink, comprising:
   a pressure source;
   a store defining a plurality of housings;
   a plurality of removable containers each immobilized, in a service position, in a respective housing, each container including
   a receptacle containing an ingredient and having a wall more than 1 mm thick and an interior volume of more than 0.1 liter, and
   an upstream emptying valve allowing said ingredient to be caused to exit to the outside of the receptacle by an increased pressure generated inside said receptacle by said pressure source;
   a chamber to receive the ingredients extracted from said containers, via the said upstream emptying one-way valves, because of said increased pressure, so as to make said drink;
   a control module able to command said increased pressures in said containers as a function of a desired composition for said drink, the control module including a processor and a memory containing code instructions for causing the processor to function,
   in which machine each housing includes an emptying coupler via which the ingredient of the container immobilized in said housing being extracted from said container, said emptying coupler opening, in a downstream direction, directly into a funnel defined by said chamber the ingredient exiting the container does not transit via any pipe before dropping into said chamber, said chamber being disposed immediately under the emptying coupler.

2. The machine as claimed in claim 1, in which the chamber includes a selectively closable filling orifice opening above a location for receiving a glass that is to say an opening and a closing of the selectively closable filling orifice are controlled by the control module.

3. The machine as claimed in claim 2, in which the control module is configured to control the opening and the closing of the filling orifice.

4. The machine as claimed in claim 1, in which each container includes a head fixed to said receptacle, said head including a pressure relief valve allowing entry into the receptacle of fluid, coming from said pressure source.

5. The machine as claimed in claim 4, in which the head is removable.

6. The machine as claimed in claim 4, in which:
the pressure relief valve has an opening pressure between 100 mbar and 1 bar inclusive, and/or
the upstream emptying one-way valve has an opening pressure between 100 mbar and 1 bar inclusive.

7. The machine as claimed in claim 1, in which each housing includes:
a downstream emptying one-way valve allowing exit of said ingredient because of an increased pressure generated inside said receptacle by said pressure source, the downstream emptying one-way valve being disposed downstream of the upstream emptying one-way valve, with reference to the direction of flow of the ingredient exiting the receptacle, or
a stopper mobile between a disengaged position and a closing position in which it respectively allows or prevents flow by gravity of the ingredient from said receptacle to said chamber.

8. The machine as claimed in claim 7, in which:
the downstream emptying one-way valve has an opening pressure lower than that of the upstream emptying one-way valve, or
the stopper is shaped to allow the placing of a container in said housing only when it is in the disengaged position.

9. The machine as claimed in claim 7, in which an intermediate volume between the upstream and downstream emptying one-way valves is less than 5 $cm^3$.

10. The machine as claimed in claim 7, in which said stopper is retaining in the closing position when the housing is not occupied by a container, this retention resulting from the weight of the stopper, or from a locking or from an application of a magnetic attraction force.

11. The machine as claimed in claim 10, the stopper being retaining in the closing position in the absence of a container in said housing by the application of a magnetic attraction force.

12. The machine as claimed in claim 1, including a circuit for depressurizing the chamber, said depressurization circuit including a depressurization line establishing fluid communication of the chamber with a pressure sink, a depressurization valve, controlled by the control module, being inserted into said depressurization line.

13. The machine as claimed in claim 12, including a compressor, an inlet of which constitutes a pressure sink and an outlet of which constitutes a pressure source.

14. The machine as claimed in claim 1, in which each container includes a wall having a thickness more than 1 mm, or has an interior volume less than 1 I, or a thickness more than 1 mm and has an interior volume less than 1 I.

15. The machine as claimed in claim 1, including, for each housing, magnetic coupling means between said housing and a container disposed in said housing.

\* \* \* \* \*